UNITED STATES PATENT OFFICE.

CONRAD SCHRAUBE, OF LUDWIGSHAFEN, GERMANY, ASSIGNOR TO THE BADISCHE ANILIN AND SODA FABRIK, OF SAME PLACE.

YELLOW DYE.

SPECIFICATION forming part of Letters Patent No. 543,784, dated July 30, 1895.

Application filed October 30, 1894. Serial No. 527,470. (Specimens.) Patented in Germany August 8, 1893, No. 79,570; in England September 30, 1893, No. 18,374, and in France October 30, 1893, No. 222,863.

*To all whom it may concern:*

Be it known that I, CONRAD SCHRAUBE, doctor of philosophy, a subject of the King of Prussia, German Emperor, residing at Ludwigshafen-on-the-Rhine, in the Kingdom of Bavaria and Empire of Germany, have invented new and useful Improvements in the Manufacture of New Yellow Coloring-Matter, (for which I have obtained patents in England, No. 18,374, dated September 30, 1893; in France, No. 222,863, dated October 30, 1893, and in Germany August 8, 1893, No. 79,570,) of which the following is a specification.

I have invented a new and useful yellow dye derived from phenanthrene. Coloring-matters closely related to the new dye have already been obtained and described in literature; but up to the date of this invention no dyes of commercial value have been obtained from the said hydrocarbon, and all efforts to find a useful technical application for phenanthrene in the dye-stuff industry have hitherto been unsuccessful.

The new dye results from the interaction under suitable conditions of phenanthrene-quinone and ortho-amido-diphenylamin.

The following example will serve to illustrate the manner in which the invention can best be carried into practical effect and the new dye obtained.

Example: Mix one (1) part, by weight, of ortho-amido-diphenylamin and one (1) part of phenanthrenequinone (or molecular proportions of these bodies) with about twenty (20) parts of glacial acetic acid and heat on the water-bath. To ascertain the course of the reaction, take tests from time to time and boil with about twenty (20) times the volume of water acidified with hydrochloric acid. When successive tests show no increase in the intensity of the coloration, then the operation may be considered finished. Then boil up the whole. Melt with twenty (20) times its volume of water acidified with hydrochloric acid. Allow to cool and filter. Precipitate the dye from the filtrate with chlorid of zinc, collect, press, and dry.

The formation of the dye can also be effected at lower temperature, but more slowly; also weaker acetic acid may be used as solvent when higher temperature is necessary. Further, the reaction can be effected in the presence of dilute hydrochloric acid without acetic acid, or the hydrochlorate of the ortho-amido-diphenylamin may be used in aqueous solution. It is also unnecessary in the manufacture of the dye to use isolated ortho-amido-diphenylamin; but the liquid resulting from the reduction of the corresponding nitro-compound with zinc-dust in acetic-acid solution can be used in a manner similar to that hereinbefore described.

The new coloring-matter is chemically beta-phenyl-phenanthro-phenazin or a salt thereof. It is characterized by the following properties: In the form of salt it is readily soluble in water, giving yellow solutions from which caustic soda precipitates the free base. Its solution in concentrated sulfuric acid is yellowish red when seen in bulk, but bluish red in thin films. On reduction with zinc-dust and hydrochloric acid a leuco compound is obtained, which is with difficulty soluble in water, readily soluble in alcohol. This alcoholic solution turns yellow again on exposure to the air or more rapidly on adding acetic acid and a little lead peroxid.

The new coloring-matter dyes tannin-mordanted goods, giving yellow shades.

Now what I claim is—

1. As a new article of manufacture the new coloring matter whether in the form of salt or as base which is chemically beta-phenyl-phenanthro-phenazin and can be derived from ortho-amido-diphenylamine and phenanthrene quinone and which in the form of salt is readily soluble in water giving a yellow solution, and in concentrated sulfuric acid giving a yellowish red solution when seen in bulk, but bluish red in thin films; on reduction with zinc and hydrochloric acid it yields a leuco-compound soluble in water with difficulty but easily soluble in alcohol, all substantially as described.

2. The process for the manufacture of new yellow coloring matter which consists in causing phenanthrene-quinone and ortho-amido-diphenyl-amine to react upon one another in the presence of glacial acetic acid substantially as described.

In testimony whereof I have hereunto set my hand in the presence of two subscribing witnesses.

CONRAD SCHRAUBE.

Witnesses:
ERNEST F. EHRHARDT,
ADOLPH REUTLINGER.